US012767608B2

(12) United States Patent
Bergman et al.

(10) Patent No.: US 12,767,608 B2
(45) Date of Patent: Oct. 20, 2026

(54) CEMENT MIXTURES FOR PLUGGING HONEYCOMB BODIES AND METHODS OF MAKING THE SAME

(71) Applicant: CORNING INCORPORATED, Corning, NY (US)

(72) Inventors: Richard Bergman, State College, PA (US); Theresa Chang, Painted Post, NY (US); Kunal Upendra Sakekar, Pune (IN); Shu Yuan, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 859 days.

(21) Appl. No.: 17/634,727

(22) PCT Filed: Aug. 5, 2020

(86) PCT No.: PCT/US2020/044945
§ 371 (c)(1),
(2) Date: Feb. 11, 2022

(87) PCT Pub. No.: WO2021/030106
PCT Pub. Date: Feb. 18, 2021

(65) Prior Publication Data

US 2022/0274890 A1 Sep. 1, 2022

Related U.S. Application Data

(60) Provisional application No. 62/885,940, filed on Aug. 13, 2019.

(51) Int. Cl.

*C04B 38/00* (2006.01)
*C04B 28/24* (2006.01)

(Continued)

(52) U.S. Cl.

CPC .......... *C04B 38/0012* (2013.01); *C04B 28/24* (2013.01); *C04B 2103/465* (2013.01); *C04B 2111/00663* (2013.01); *C04B 2201/10* (2013.01)

(58) Field of Classification Search

CPC ................ C04B 38/0012; C04B 28/24; C04B 2103/465; C04B 2111/00663;

(Continued)

(56) References Cited

U.S. PATENT DOCUMENTS 3,885,977 A 5/1975 Lachman et al.
4,483,944 A 11/1984 Day et al.

(Continued)

FOREIGN PATENT DOCUMENTS

CN 101801879 A 8/2010
CN 105906367 A 8/2016

(Continued)

OTHER PUBLICATIONS

Chinese Patent Application No. 202080071674.4, Office Action dated Sep. 2, 2022, 4 pages (English translation only), Chinese Patent Office.

(Continued)

*Primary Examiner* — Amber R Orlando
*Assistant Examiner* — Anastasia A. Kuvayskaya
(74) *Attorney, Agent, or Firm* — Kevin M. Able

(57) ABSTRACT

A cement mixture for applying to a honeycomb body that includes: (i) inorganic ceramic particles; (ii) an inorganic binder; (iii) an organic binder comprising one or more of a hydrophilic polymer and a hydrophilic additive; and (iv) an aqueous liquid vehicle. The cement mixture exhibits a cement viscosity of less than 7000 Pa·s at a shear rate of less than 0.1/sec and greater than 25 Pa·s at a shear rate from 20/sec to 100/sec.

10 Claims, 9 Drawing Sheets

(51) Int. Cl.
*C04B 103/46* (2006.01)
*C04B 111/00* (2006.01)

(58) Field of Classification Search
CPC ............ C04B 2201/10; B01D 29/0093; B01D 35/005; B01D 39/2068; B01D 2201/62
See application file for complete search history.

(56) References Cited

U.S. PATENT DOCUMENTS

| | | | |
|---|---|---|---|
| 4,855,265 | A | 8/1989 | Day et al. |
| 5,183,608 | A | 2/1993 | Guile |
| 5,258,150 | A | 11/1993 | Merkel et al. |
| 5,290,739 | A | 3/1994 | Hickman |
| 6,210,626 | B1 | 4/2001 | Cornelius et al. |
| 6,319,870 | B1 | 11/2001 | Beall et al. |
| 6,368,992 | B1 | 4/2002 | Beall et al. |
| 6,432,856 | B1 | 8/2002 | Beall et al. |
| 6,620,751 | B1 | 9/2003 | Ogunwumi |
| 6,673,300 | B2 | 1/2004 | Allen et al. |
| 6,773,657 | B2 | 8/2004 | Beall et al. |
| 6,849,181 | B2 | 2/2005 | Ogunwumi et al. |
| 6,864,198 | B2 | 3/2005 | Merkel |
| 6,942,713 | B2 | 9/2005 | Ogunwumi et al. |
| RE38,888 | E | 11/2005 | Beall et al. |
| 8,435,441 | B2 | 5/2013 | Bookbinder et al. |
| 2004/0020846 | A1 | 2/2004 | Ogunwumi et al. |
| 2004/0029707 | A1 | 2/2004 | Beall et al. |
| 2004/0092381 | A1 | 5/2004 | Beall et al. |
| 2004/0261384 | A1 | 12/2004 | Merkel et al. |
| 2009/0033005 | A1 | 2/2009 | Bookbinder et al. |
| 2009/0274866 | A1 | 11/2009 | Fabian et al. |
| 2012/0220444 | A1* | 8/2012 | Crume .................. C04B 35/634 501/153 |
| 2013/0136893 | A1 | 5/2013 | Bubb et al. |
| 2017/0044066 | A1 | 2/2017 | Bubb et al. |
| 2021/0155555 | A1 | 5/2021 | Backhaus-Ricoult et al. |

FOREIGN PATENT DOCUMENTS

| | | | | |
|---|---|---|---|---|
| EP | 0134138 | B1 | 7/1989 | |
| EP | 2646397 | A1 | 10/2013 | |
| WO | 2004/011386 | A1 | 2/2004 | |
| WO | 2005/046840 | A1 | 5/2005 | |
| WO | 2006/015240 | A2 | 2/2006 | |
| WO | 2009/017642 | A1 | 2/2009 | |
| WO | WO-2009070250 | A1 * | 6/2009 | ............. C04B 28/24 |
| WO | WO-2010038245 | A1 * | 4/2010 | ......... B01D 46/2418 |
| WO | 2012/074977 | A1 | 6/2012 | |
| WO | WO-2015168530 | A1 * | 11/2015 | ............. C04B 28/24 |
| WO | 2017/082299 | A1 | 5/2017 | |

OTHER PUBLICATIONS

International Search Report and Written Opinion of the International Searching Authority; PCT/US20/44945; Mailed Jan. 18, 2021; 14 Pages; European Patent Office.

Invitation to Pay Additional Fees of the International Searching Authority; PCT/US20/44945; Mailed Nov. 13, 2020; 10 Pages; European Patent Office.

* cited by examiner

Ex.1A

Ex.1

Ex.1B

Ex.1C

Ex. 1B

Oven Dry

Ex. 1

Air Dry

Ex. 1C

Ex. 1B

Ex. 1B

CEMENT MIXTURES FOR PLUGGING HONEYCOMB BODIES AND METHODS OF MAKING THE SAME

CROSS REFERENCE TO RELATED APPLICATIONS

This is a national stage application under 35 U.S.C. § 371 of International Application No. PCT/US2020/044945, filed on Aug. 5, 2020, which claims the benefit of priority under 35 U.S.C § 120 of U.S. Provisional Application Ser. No. 62/885,940 filed on Aug. 13, 2019, the content of which is relied upon and incorporated herein by reference its entirety their entireties.

FIELD OF THE DISCLOSURE

The disclosure relates generally to the manufacture of porous ceramic particulate filters, and more particularly to improved plugging mixtures and processes for sealing selected channels of porous ceramic honeycombs to form wall-flow ceramic filters.

BACKGROUND

Ceramic wall flow filters are finding widening use for the removal of particulate pollutants from diesel or other combustion engine exhaust streams. A number of different approaches for manufacturing such filters from channeled honeycomb structures formed of porous ceramics are known. The most widespread approach is to position plugs of sealing material at the ends of alternate channels of such structures which can block direct fluid flow through the channels and force the fluid stream through the porous channel walls of the honeycombs before exiting the filter.

Diesel particulate filters (DPFs) and gas particulate filters (GPFs) can consist of a parallel array of channels with every other channel on each face sealed in a checkered pattern such that exhaust gases from the engine would have to pass through the walls of the channels in order to exit the filter. These filter configurations can be formed by extruding a matrix that makes up the array of parallel channels and then sealing or "plugging" every other channel with a sealant in a secondary processing step. Further, some of these filters are asymmetric in the sense that adjacent channels possess differing diameters or effective cross-sectional areas.

There is a need in the art for improved plugging mixtures for forming ceramic wall flow filters.

SUMMARY OF THE DISCLOSURE

According to some aspects of the present disclosure, a cement mixture for applying to a honeycomb body is provided. The cement mixture comprises: (i) inorganic ceramic particles; (ii) an inorganic binder; (iii) an organic binder comprising one or more of a hydrophilic polymer and a hydrophilic additive; and (iv) an aqueous liquid vehicle. The cement mixture exhibits a cement viscosity of less than 7000 Pa·s at a shear rate of less than 0.1/sec and greater than 25 Pa·s at a shear rate from 20/sec to 100/sec.

According to some aspects of the present disclosure, a cement mixture for applying to a honeycomb body is provided. The cement mixture comprises: (i) inorganic ceramic particles from 55% to 70% by weight; (ii) an inorganic binder at 15% to 20% by weight; (iii) an organic binder at 0.25% to 1.25% by weight, the organic binder comprising one or more of a hydrophilic polymer and a hydrophilic additive; and (iv) an aqueous liquid vehicle at 15% to 20% by weight.

According to some aspects of the present disclosure, a method for manufacturing a porous ceramic wall flow filter is provided. The method for manufacturing comprises a step of selectively inserting a cement mixture into an end of at least one predetermined cell channel of a ceramic honeycomb structure, wherein the ceramic honeycomb structure comprises a matrix of intersecting porous ceramic walls which form a plurality of cell channels bounded by the porous ceramic walls that extend longitudinally from an upstream inlet end to a downstream outlet end and the cement mixture comprises: (i) inorganic ceramic particles; (ii) an inorganic binder; (iii) an organic binder comprising one or more of a hydrophilic polymer and a hydrophilic additive; and (iv) an aqueous liquid vehicle. The cement mixture disposed in at least one predetermined cell channel is in the form of at least one respective plug that blocks the respective at least one channel. The method also comprises a step of drying the at least one plug for a period of time sufficient to at least substantially remove the liquid vehicle from the at least one plug. The cement mixture exhibits a cement viscosity of less than 7000 Pa·s at a shear rate of less than 0.1/sec and greater than 25 Pa·s at a shear rate from 20/sec to 100/sec.

According to some aspects of the disclosure, a filter body is provided that comprises: a honeycomb structure comprised of intersecting porous walls of a first ceramic material that define channels extending from a first end to a second end; plugging material disposed in a first plurality of the channels; plugging material disposed in a second plurality of the channels, wherein the channels of the first plurality are distinct from the channels of the second plurality; wherein the plugging material disposed in the first plurality, or in the second plurality, or both, is comprised of: a second ceramic material; an inorganic binder comprising one or more of silica and alumina; and an organic binder comprising one or more of a hydrophilic polymer and a hydrophilic additive.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description describe various embodiments and are intended to provide an overview or framework to understanding the nature and character of the claimed subject matter.

The accompanying drawings are included to provide a further understanding of the various embodiments, and are incorporated into and constitute a part of this specification. The drawings illustrate the various embodiments described herein, and together with the description serve to explain the principles and operation of the claimed subject matter.

BRIEF DESCRIPTION OF THE DRAWINGS

The following is a description of the FIGURES in the accompanying drawings. The FIGURES are not necessarily to scale, and certain features and certain views of the FIGURES may be shown exaggerated in scale or in schematic in the interest of clarity and conciseness.

In the drawings.

Figure 1A:
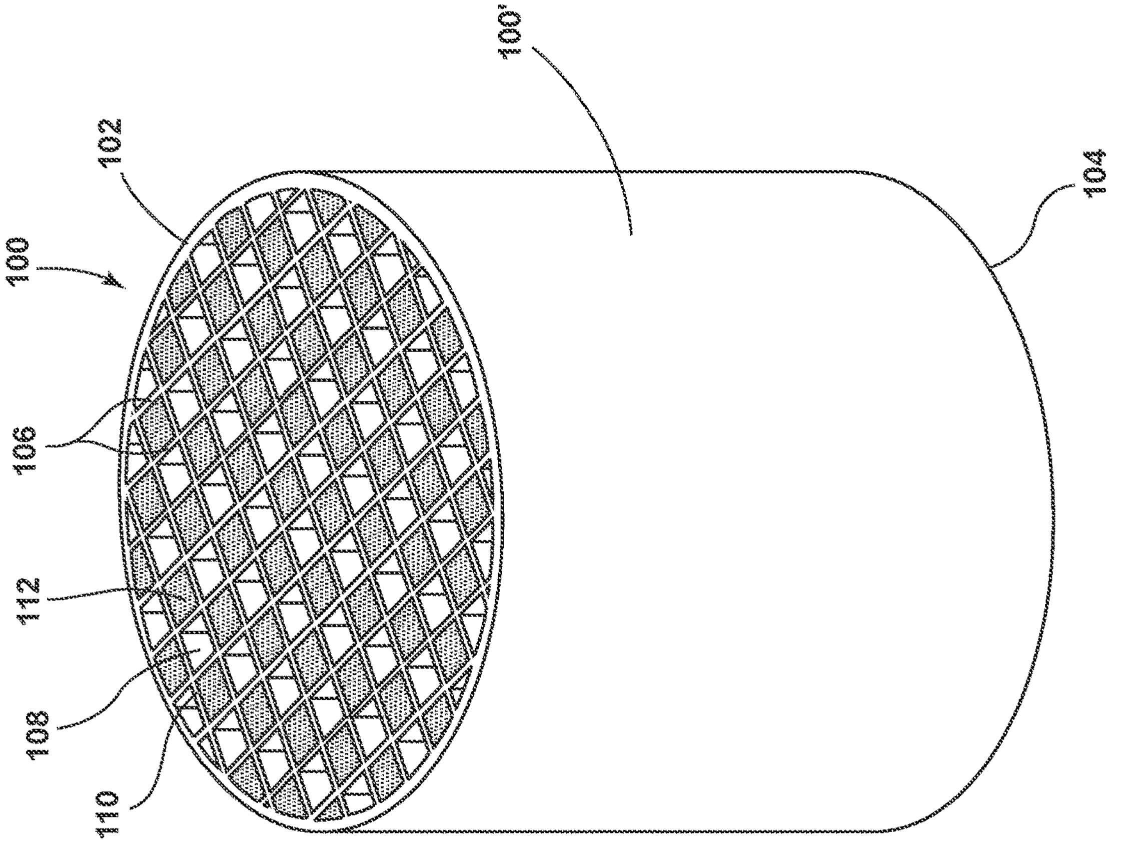
FIG. 1A is a perspective view of an end plugged wall flow filter, according to an embodiment of the disclosure.

The foregoing summary, as well as the following detailed description of certain inventive techniques, will be better understood when read in conjunction with the figures. It should be understood that the claims are not limited to the arrangements and instrumentalities shown in the FIGURES. Furthermore, the appearance shown in the FIGURES is one of many ornamental appearances that can be employed to achieve the stated functions of the apparatus.

DETAILED DESCRIPTION OF THE PREFERRED EMBODIMENTS

Additional features and advantages will be set forth in the detailed description which follows and will be apparent to those skilled in the art from the description, or recognized by practicing the embodiments as described in the following description, together with the claims and appended drawings.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

Unless otherwise noted, the terms "substantial," "substantially," and variations thereof as used herein are intended to note that a described feature is equal or approximately equal to a value or description. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the FIGURES as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, a "wt. %", "weight percent" or "percent by weight" of a component, unless specifically stated to the contrary, is based on the total weight of the cement mixture in which the component is included.

As used herein, the term "optional" or "optionally" means that the subsequently described event or circumstance may or may not occur, and that the description includes instances where said event or circumstance occurs and instances where it does not.

As used herein, the term "liquid viscosity" refers to a liquid viscosity measurement of the liquids component of the cement mixtures of the disclosure, i.e., as excluding its inorganic ceramic particles constituent. Further, the "liquid viscosity" values and ranges reported in the disclosure are as measured with a Kinexus Pro rheometer (manufactured by Malvern Panalytical Ltd.) with a spindle geometry C25 and reported in units of centipoise (cP) vs. shear rate ($s^{-1}$). Unless otherwise noted, liquid viscosity measurements of the liquids component are obtained with the cement mixtures at a shear rate range from about 0.001/s to about 100/s, or a sub-range within this range.

As used herein, the term "cement viscosity" or "viscosity" refers to a viscosity measurement of the solids component of the cement mixtures of the disclosure, i.e., as without excluding any of its constituents. Further, the "cement viscosity" values and ranges reported in the disclosure are as measured with a Brookfield viscometer with a spiral adapter spindle and reported in units of Pa·s vs. shear rate ($s^{-1}$). Unless otherwise noted, cement viscosity measurements are obtained with the cement mixtures at a shear rate range from about 0.007/s to about 100/s.

As summarized generally above, the cement mixtures of the disclosure offer an improved plugging mixture composition for forming ceramic wall flow filters. The cement mixtures of the disclosure employ: (i) inorganic ceramic particles; (ii) an inorganic binder; (iii) an organic binder comprising one or more of a hydrophilic polymer and a hydrophilic additive; and (iv) an aqueous liquid vehicle. These cement mixtures provide a controlled rheology which can enable a broader range of plug depths without sacrificing plug strength, plug quality (e.g., as manifested by the avoidance of voids and dimples), uniformity of depth, as well as throughput and production speed. These cement mixtures comprise cement rheology modifiers (e.g., hydrophilic polymer(s) and/or hydrophilic additives) that can result in higher viscosity levels at high shear rates (which affects plug depth capability), and can maintain a lower viscosity at low shear rates (which affects plug quality). As is understood in the field of the disclosure, the shear rates of the cement mixture change during the process of plugging the honeycomb body—i.e., from low shear rates as the plugging mixture is contained in a reservoir and applied to the honeycomb body to high shear rates as the plugging mixture is injected into the channels of the honeycomb body and friction works against movement of the mixture within the channels. Ultimately, the cement mixtures of the disclosure possess a rheological behavior with viscosity levels that vary as a function of shear rate, which can help form a wall flow filter with a combination of high quality plugs and increased plug depths.

Advantageously, the cement mixtures of the disclosure, when employed as plugging mixtures, do not result in the formation of appreciable amounts of pin holes, dimples or large internal voids. The cement mixtures have rheological properties sufficient to hold their shape while in the form of a preform slug yet that can also flow properly during pressing of the mixture into the substrate, wall flow filter or the like. Further, the cement mixtures of the disclosure can advantageously enable a wide range of plug depths (e.g., from 3 to 25 mm depending on the geometry of the wall flow filter). The cement mixtures can also enable a broad plugging process window which can achieve a combination of plug depth and plug quality at plug depths approaching maximum achievable plug depths. Further, the cement mixtures of the disclosure can enable plugging of wall flow filters with varying, asymmetric channel sizes with a single cement mixture composition.

Referring now to FIG. 1A, an exemplary end plugged wall flow filter 100 is shown. As illustrated, the wall flow filter 100 comprises a ceramic honeycomb structure 100' that has an upstream inlet end 102 and a downstream outlet end 104, and a multiplicity of cells 108 (inlet), 110 (outlet) extending longitudinally from the inlet end 102 to the outlet end 104. The multiplicity of cells is formed from intersecting porous cell walls 106. A first portion of the plurality of cell channels are plugged with end plugs 112 at the downstream outlet end (not shown) to form inlet cell channels and a second portion of the plurality of cell channels are plugged at the upstream inlet end with end plugs 112 to form outlet cell channels. The exemplified plugging configuration forms alternating inlet and outlet channels such that a fluid stream flowing into the reactor through the open cells at the inlet end 102, then through the porous cell walls 106, and out of the reactor through the open cells at the outlet end 104. The exemplified end plugged cell configuration can be referred to herein as a "wall flow" configuration since the flow paths resulting from alternate channel plugging direct a fluid stream being treated to flow through the porous ceramic cell walls prior to exiting the filter.

The honeycomb structure 100' can be formed from a material suitable for forming a porous monolithic honeycomb body. For example, in one embodiment, the substrate can be formed from a plasticized ceramic forming composition. Exemplary ceramic forming compositions can include those for forming cordierite, aluminum titanate, silicon carbide, aluminum oxide, zirconium oxide, zirconia, magnesium stabilized zirconia, zirconia stabilized alumina, yttrium stabilized zirconia, calcium stabilized zirconia, alumina, magnesium stabilized alumina, calcium stabilized alumina, titania, silica, magnesia, niobia, ceria, vanadia, silicon nitride, or any combination thereof.

The formed honeycomb structure 100' can have an exemplary cell density of from about 70 cells/in$^2$ (10.9 cells/cm$^2$) to about 400 cells/in$^2$ (62 cells/cm). Still further, as described above, a portion of the cells 110 at the inlet end 102 are plugged with end plugs 112 of a cement mixture having the same or similar composition to that of the formed honeycomb structure 100'. The plugging is preferably performed only at the ends of the cells and form plugs 112 having a depth of about 3 to 25 mm, although this can vary. A portion of the cells on the outlet end 104 but not corresponding to those on the inlet end 102 may also be plugged in a similar pattern. Therefore, each of the cells 110 is preferably plugged only at one end. The preferred arrangement is to therefore have every other cell on a given face plugged as in a checkered pattern as shown in FIG. 1A. Further, the inlet and outlet channels can be any desired shape. However, in the exemplified embodiment shown in FIG. 1A, the cell channels are square in cross-sectional shape.

Referring again to FIG. 1A, once the honeycomb structure 100' is formed, the end plugged wall flow filter 100 can be developed through the creation of the end plugs 112. In particular, the end plugs 112 can employ the cement mixture compositions of the disclosure. The cement mixtures of the disclosure comprise: (i) inorganic ceramic particles; (ii) an inorganic binder; (iii) an organic binder comprising one or more of a hydrophilic polymer and a hydrophilic additive; and (iv) an aqueous liquid vehicle. In embodiments of the cement mixtures of the disclosure, the organic binder is a hydrophilic polymer that can comprise one or more of hydroxyethyl cellulose (HEC), methyl cellulose, polyethylene oxide (PEO) (e.g., at a molecular weight (MW) from about 300,000 to about 8,000,000), carboxymethyl cellulose, hydroxypropyl cellulose, polyvinyl alcohol, poly(2-oxazoline), dextran, dextrin, a gum, pectin, polysaccharides, modified cellulose, polyacrylic acid and polystyrene sulfonate. In some implementations of the cement mixtures of the disclosure, the organic binder of the cement mixture is a hydrophilic additive that comprises one or more of polyethylene oxide (PEO), polyvinylpyrrolidone (PVP), xanthan gum, a PEO-polypropylene oxide (PPO) block copolymer, and PPO. In an embodiment of the cement mixtures of the disclosure, e.g., as employed in end plugs 112 shown in FIG. 1A, the organic binder comprises one of: (a) HEC; (b) PEO; (c) HEC and PEO; and (d) methyl cellulose and PEO.

The inorganic ceramic particles of the cement mixtures of the disclosure, e.g., as used for the end plugs 112 shown in FIG. 1A, can be comprised of materials and precursors suitable for firing or heat treatment into a ceramic form and/or as-fired ceramic particles that require no additional firing or heat treatment. In embodiments, the inorganic ceramic particles employed in the cement mixtures of the disclosure comprise a combination of inorganic components sufficient to form a desired sintered (as-fired) phase ceramic composition, including for example a predominantly sintered phase composition comprised of ceramic, glass-ceramic, glass, and combinations thereof. Exemplary and non-limiting inorganic materials suitable for use in these inorganic ceramic particles can include cordierite, aluminum titanate, mullite, clay, kaolin, magnesium oxide sources, talc, zircon, zirconia, spinel, alumina forming sources, including aluminas and their precursors, silica forming sources, including silicas and their precursors, silicates, aluminates, lithium aluminosilicates, alumina silica, feldspar, titania, fused silica, nitrides, carbides, borides, e.g., silicon carbide, silicon nitride or mixtures of these materials.

For example, in one embodiment, the inorganic ceramic particles of the cement mixtures of the disclosure can comprise a mixture of cordierite-forming components (i.e., in a green state) that can be heated under conditions effective to provide a sintered phase cordierite composition. According to this embodiment, the inorganic ceramic particles can comprise a magnesium oxide source; an alumina source; and a silica source. For example, and without limitation, the inorganic ceramic particles can be selected to provide a cordierite composition consisting essentially of from about 49 to about 53 percent by weight $SiO_2$, from about 33 to about 38 percent by weight $Al_2O_3$, and from about 12 to about 16 percent by weight MgO. An exemplary inorganic cordierite precursor composition can comprise about 33 to about 41 weight percent aluminum oxide source, about 46 to about 53 weight percent of a silica source, and about 11 to about 17 weight percent of a magnesium oxide source. Exemplary non-limiting inorganic ceramic particle compositions suitable for forming cordierite include those disclosed in U.S. Pat. No. 3,885,977; RE 38,888; U.S. Pat. Nos. 6,368,992; 6,319,870; 6,210,626; 5,183,608; 5,258,150; 6,432,856; 6,773,657; and 6,864,198; and U.S. Patent Application Publication Nos.: 2004/0029707 and 2004/0261384, the entire disclosures of which are incorporated by reference herein.

In an alternative embodiment, the inorganic ceramic particles of the cement mixtures of the disclosure can comprise a mixture of aluminum titanate-forming components (i.e., in a green state) that can be heated under conditions effective to provide a sintered phase aluminum titanate composition. In accordance with this embodiment, the inorganic ceramic particles can comprise powdered raw materials, including an alumina source, a silica source, and a titania source. These inorganic powdered raw materials can, for example, be selected in amounts suitable to provide a sintered phase aluminum titanate ceramic composition comprising, as characterized in an oxide weight percent basis, from about 8 to about 15 percent by weight $SiO_2$, from about 45 to about 53 percent by weight $Al_2O_3$, and from about 27 to about 33 percent by weight $TiO_2$. An exemplary inorganic aluminum titanate precursor composition can comprise approximately 10% quartz; approximately 47% alumina; approximately 30% titania; and approximately 13% additional inorganic additives. Additional exemplary non-limiting inorganic ceramic particles suitable for forming aluminum titanate include those disclosed in U.S. Pat. Nos. 4,483,944; 4,855,265; 5,290,739; 6,620,751; 6,942,713; and 6,849,181; U.S. Patent Application Publication Nos.: 2004/0020846 and 2004/0092381; and PCT Application Publication Nos.: WO 2006/015240; WO 2005/046840; and WO 2004/011386, the entire disclosures of the aforementioned references are incorporated by reference.

As noted earlier, the inorganic ceramic particles employed in the cement mixtures of the disclosure (e.g., as used in end plugs 112 shown in FIG. 1A), can comprise as-fired ceramic powders that require no additional firing or heat treatment, i.e., inorganic refractory compositions that have been previously fired, heat treated or otherwise subjected to a ceramming treatment. Exemplary cerammed inorganic refractory compositions suitable for use in the inorganic ceramic particles comprise: silicon carbide, silicon nitride, aluminum titanate, mullite, calcium aluminate, and cordierite. According to one embodiment of the cement mixtures of the disclosure, the inorganic ceramic particles comprise a fired cordierite composition. Suitable cerammed cordierite compositions for use in the inorganic ceramic particles can be obtained commercially from known sources, including for example, Corning Incorporated, Corning, N.Y., USA. Alternatively, a suitable cordierite composition can also be manufactured by heating a cordierite forming batch composition, as described above, under conditions effective to convert the batch composition into a sintered phase cordierite. In one embodiment, a suitable cerammed cordierite consists essentially of from about 49 to about 53 percent by weight $SiO_2$, from about 33 to about 38 percent by weight $Al_2O_3$, and from about 12 to about 16 percent by weight MgO.

As noted earlier, the cement mixtures of the disclosure possess a rheological behavior with viscosity levels that can vary as a function of shear rate, which aid in the formation of a wall flow filter with a combination of high quality plugs and increased plug depths and facilitate the use of inorganic ceramic particles and/or powder, such as cordierite, with varying particle size distributions. In some implementations of the cement mixtures of the disclosure, the cordierite particles have a median particle size $d_{50}$ in the range of from about 0.1 μm to about 250 μm, from about 1 μm to about 150 μm, or from about 10 μm to about 45 μm. In another embodiment, the powdered cordierite component can comprise a blend of two or more cordierite compositions, each having differing median particle sizes.

The cement mixtures of the disclosure comprise one or more additive components, such as an inorganic binder. As used herein, the "inorganic binder" employed in the cement mixtures of the disclosure is an aqueous dispersion of inorganic particles. Such an aqueous dispersion can comprise, for example, from about 30 wt. % to 70 wt. % inorganic particles in water. For example, in one embodiment, the cement mixture comprises an inorganic binder, such as for example, a borosilicate glass particles in water, e.g., from about 30 wt. % to 70 wt. % particles in water. Other exemplary inorganic binders include colloidal silica and/or colloidal alumina, e.g., from about 30 wt. % to 70 wt. % particles in water.

The cement mixtures of the disclosure also comprise a liquid vehicle. One liquid vehicle for providing a flow-able or paste-like consistency to the cement mixtures of the disclosure is water, although other liquid vehicles exhibiting solvent action with respect to suitable temporary organic binders can be used. The amount of the liquid vehicle component can vary in order to impart optimum handling properties and compatibility with the other components in the ceramic batch mixture. In some embodiments, the liquid vehicle content is an aqueous liquid vehicle.

Still referring to the cement mixtures of the disclosure, each comprise: (i) inorganic ceramic particles; (ii) an inorganic binder; (iii) an organic binder comprising one or more of a hydrophilic polymer and a hydrophilic additive; and (iv) an aqueous liquid vehicle. In embodiments, the inorganic ceramic powder is present in the cement mixture at a relatively high percentage by weight of the cement mixture (>50% by weight), with the inorganic binder, organic binder and liquid vehicle being present as additional components of the mixture at relatively lower weight percentages. In some embodiments, for example, the cement mixture comprises: (i) an inorganic ceramic powder at 55% to 70% by weight; (ii) an inorganic binder at 15% to 20% by weight; (iii) an organic binder at 0.25% to 1.25% by weight, the organic binder comprising one or more of a hydrophilic polymer and a hydrophilic additive; and (iv) an aqueous liquid vehicle at 15% to 20% by weight.

According to embodiments of the cement mixtures of the disclosure, the inorganic ceramic powder is present in the cement mixture at from 45% to 80% by weight, from 50% to 75% by weight, or from 55% to 70% by weight. Embodiments of these cement mixtures include an inorganic ceramic powder at 45%, 50%, 55%, 60%, 65%, 70%, 75%, or 80% by weight, including all ranges and sub-ranges between the foregoing levels.

Implementations of the cement mixtures of the disclosure comprise an aqueous liquid vehicle in the range of from 5% to 35%, 10% to 30%, or 15% to 20% by weight. Embodiments of these cement mixtures include an aqueous liquid vehicle at 5%, 10%, 15%, 20%, 25%, 30%, or 35% by weight, including all ranges and sub-ranges between the foregoing levels.

Implementations of the cement mixtures of the disclosure comprise an inorganic binder (i.e., an aqueous dispersion of inorganic particles, such as colloidal silica) in the range of from 5% to 35%, 10% to 30%, or 15% to 20% by weight. Embodiments of these cement mixtures comprise an inorganic binder at 5%, 10%, 15%, 20%, 25%, 30%, or 35% by weight, including all ranges and sub-ranges between the foregoing levels.

Some implementations of the cement mixtures of the disclosure comprise an organic binder at 0.01% to 5%, 0.1% to 3%, or 0.25% to 1.25% by weight. Embodiments of these cement mixtures comprise an organic binder at 0.01%, 0.05%, 0.1%, 0.2%, 0.3%, 0.4%, 0.5%, 0.6%, 0.7%, 0.8%, 0.9%, 1%, 1.25%, 1.5%, 1.75%, 2%, 3%, 4%, or 5% by weight, including all ranges and sub-ranges between the foregoing levels.

In some embodiments of the cement mixtures of the disclosure, the relative amounts of the constituents can be affected by the packing efficiency of the solids in the liquid medium. In such embodiments, the cement mixture comprises a solids component and a liquids component, the solids component comprising the inorganic ceramic powder and the liquids component comprising the inorganic binder, the organic binder and the aqueous liquid vehicle. Further, in these embodiments, the cement mixture exhibits a ratio of the solids component to the liquids component from 0.82:1 to 4:1, from 1:1 to 3:1, or from 1.2:1 to 2.4:1. For example, the ratio of the solids component to the liquids component in the cement mixture can be 0.82:1, 0.9:1, 1:1, 1.2:1, 1.4:1, 1.6:1, 1.8:1, 2:1, 2.2:1, 2.4:1, 2.6:1, 2.8:1, 3:1, 3.5:1, 4:1, and all ratios between these levels.

According to an implementation of the cement mixtures of the disclosure, the organic binder comprises one of: (a) HEC at 0.2% to 0.7%, 0.3% to 0.6%, or 0.35% to 0.53% by weight; (b) PEO at 0.1% to 0.8%, 0.2% to 0.7%, or 0.3% to 0.6% by weight; (c) HEC and PEO at 0.1% to 1% and 0.03% to 0.47%, 0.25% to 0.55% and 0.03% to 0.47%, or 0.35% to 0.45% and 0.03% to 0.47% by weight, respectively; and (d) methyl cellulose and PEO at 0.3% to 8% and 0.03% to 0.47%, 0.4% to 0.7% and 0.03% to 0.47%, or 0.5% to 0.6% and 0.03% to 0.47% by weight, respectively. In some embodiments, the cement mixtures of the disclosure include combinations of the above constituents with weight percentages adjusted based on the relative amounts of one of the constituents relative to the other(s).

The cement mixtures of the disclosure (e.g., as used to form the end plugs 112 shown in FIG. 1A) can be characterized by a rheological profile with viscosity ranges that are controlled independently at the high and low shear rate regimes associated with a process of plugging a honeycomb body. In some implementations, the cement mixture exhibits a cement viscosity of less than 7000 Pa·s at a shear rate of less than 0.1/sec and a cement viscosity of greater than 25 Pa·s at a shear rate from 20/sec to 100/sec, or a cement viscosity of less than 7000 Pa·s at a shear rate of less than 0.2/sec and a cement viscosity of greater than 25 Pa·s at a shear rate from 40/sec to 100/sec. For example, the cement mixture, at a shear rate of less than 0.1/sec, can exhibit a cement viscosity of less than 7000 Pa·s, 6000 Pa·s, 5000 Pa·s, 4000 Pa·s, 3000 Pa·s, 2000 Pa·s, 1000 Pa·s, 500 Pa·s, and all cement viscosities in the foregoing cement viscosity ranges. Further, the cement mixture, at a shear rate from 20/sec to 100/sec, can exhibit a cement viscosity of greater than 25 Pa·s, 20 Pa·s, 15 Pa·s, 10 Pa·s, 5 Pa·s, 1 Pa·s, 0.5 Pa·s, 0.1 Pa·s, 0.05 Pa·s, and all cement viscosities in the foregoing viscosity ranges.

According to some embodiments, the liquids component of the cement mixture (i.e., as excluding the inorganic ceramic powder constituent) of the disclosure can exhibit a liquid viscosity from 50 centipoise (cP) to 1500 cP at a shear rate of 0.001/sec, in which the liquid viscosity is measured from a wet mixture of (ii) the inorganic binder, (iii) the organic binder comprising one or more of a hydrophilic polymer and a hydrophilic additive, and (iv) the aqueous liquid vehicle, which excludes (i) the inorganic ceramic powder. The liquids component of the cement mixture can also exhibit a liquid viscosity from 100 cP to 1000 cP, or from 100 cP to 600 cP, at a shear rate of 0.001/sec. For example, the liquids component of the cement mixture can exhibit a liquid viscosity of 50 cP, 100 cP, 200 cP, 300 cP, 400 cP, 500 cP, 600 cP, 700 cP, 800 cP, 900 cP, 1000 cP, 1100 cP, 1200 cP, 1300 cP, 1400 cP, 1500 cP, and all liquid viscosities and sub-ranges between these viscosity levels.

Figure 1B:
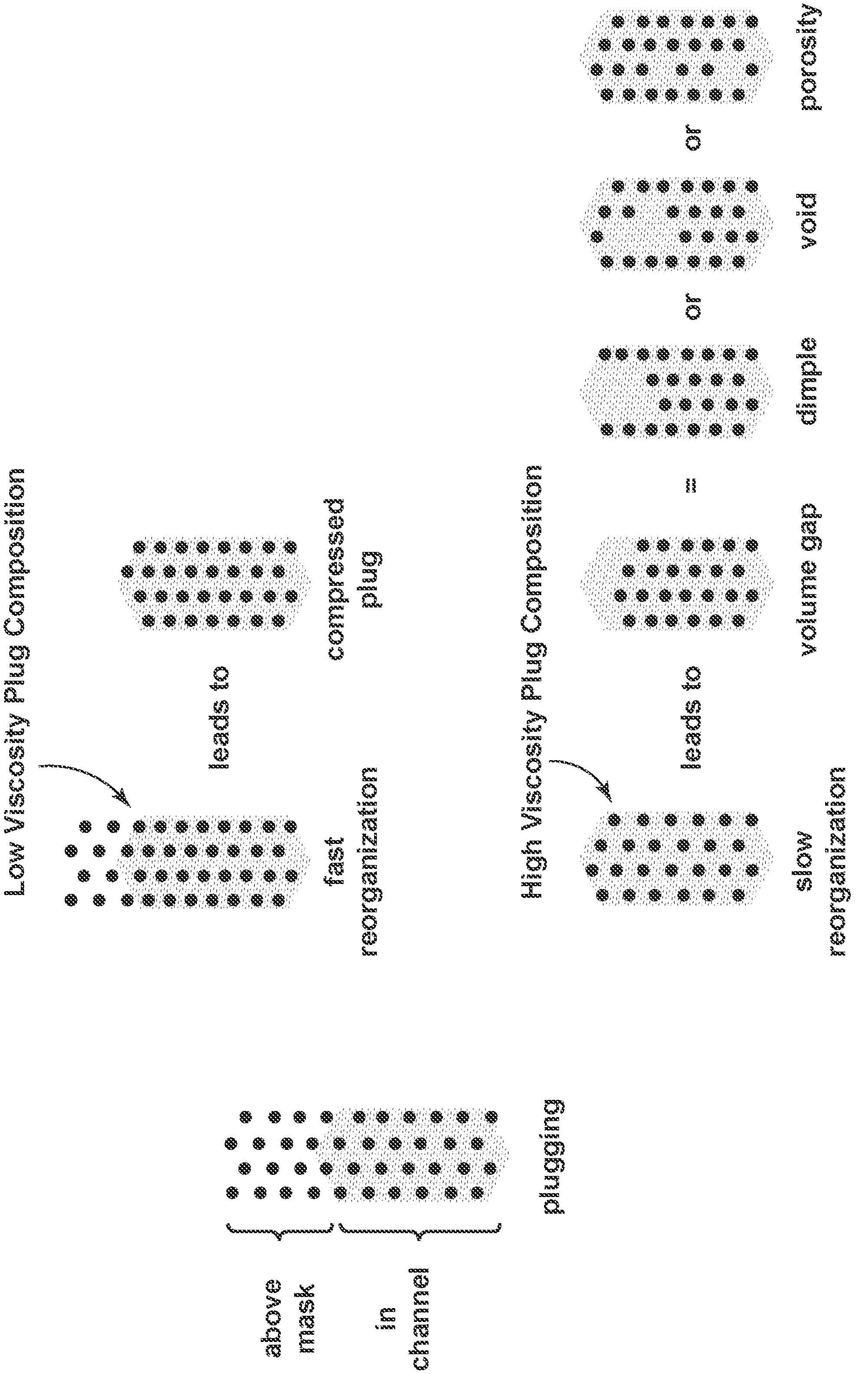
FIG. 1B is a schematic diagram of cement mixtures for applying to a honeycomb body with different fluid viscosities.

Referring now to FIG. 1B, a schematic diagram is provided of cement mixtures suitable for application into a honeycomb body with different fluid viscosities at a low shear rate regime (e.g., at shear rates of <0.001/sec). As shown in the figure, grog (i.e., inorganic ceramic powder) rearrangement is demonstrated for two different types of cement mixtures—(a) one with a low fluids viscosity comparable to those of the disclosure (shown in the top line of the FIG. 1B) and (b) one with a high fluids viscosity. At stages of the plugging process with low shear rates, the cement mixture is generally capable of rapid movement of the grog and, therefore, faster rearrangement of the particles as the particles move to pack and form plugs. For a cement mixture with a liquids component having a low liquid viscosity (e.g., <1500 cP) at these shear rates, there is ample time to complete the rearrangement before a mask (as employed in the plugging process) is peeled off of the honeycomb body and therefore a cement reservoir exists to pull particles from, resulting in a more compressed, higher quality plug. In contrast, for a cement mixture with a high liquid viscosity (e.g., >>1500 cP) at these shear rates, the reservoir cement will be removed before the completion of the grog particle rearrangement. Therefore, the rearrangement will continue but without a reservoir to draw from, there is less grog in the resultant plug. Consequently, a volume gap can form within the plugs, which can be manifested as dimples, voids or undesired porosity as the grog particles in the cement mixture continue to rearrange and pack within the plug. Hence, at low shear rates, the low liquid viscosities of the cement mixtures of the disclosure provide higher mobility within the cement mixture of the plug, resulting in more compact plugs with less prevalence of voids, dimples and porosity.

Figure 2:
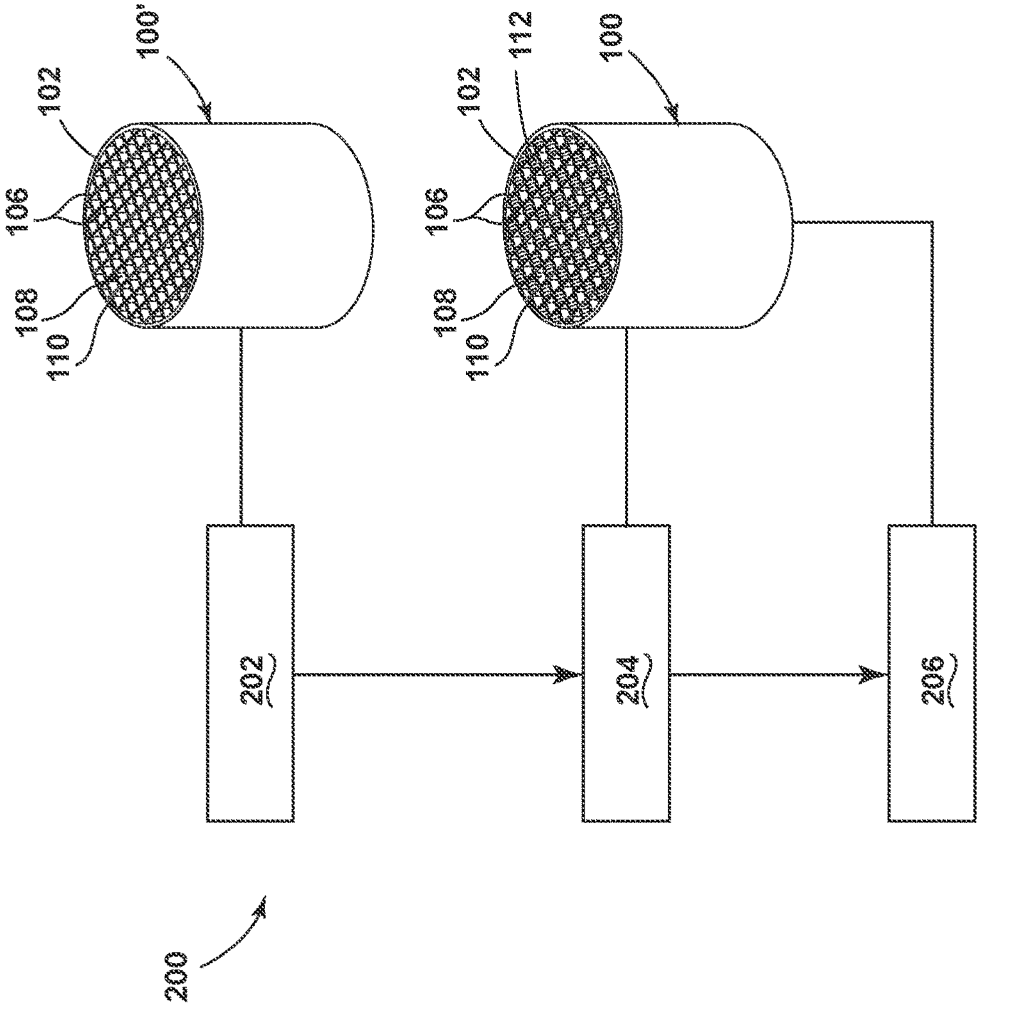
FIG. 2 is a schematic flow chart of a method for manufacturing a porous ceramic wall flow filter, according to an embodiment of the disclosure.
Figure 3A:
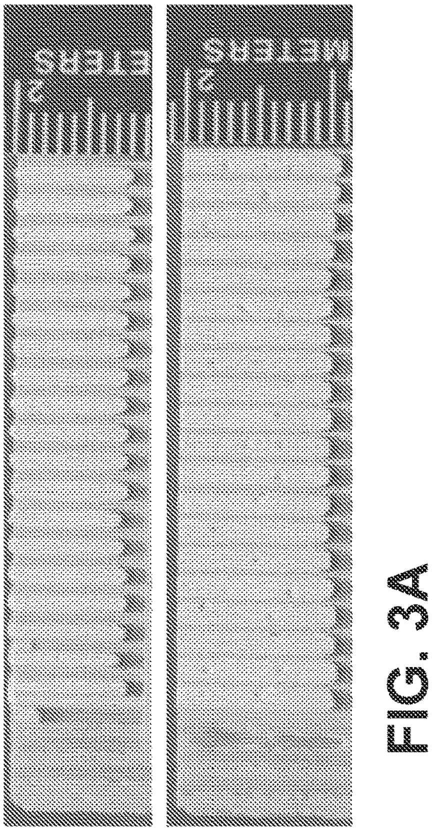
FIGS. 3A-3D are optical micrographs of respective cross-sections of porous ceramic wall filters with cement mixtures disposed in their respective cell channels, according to embodiments of the disclosure.
Figure 3B:
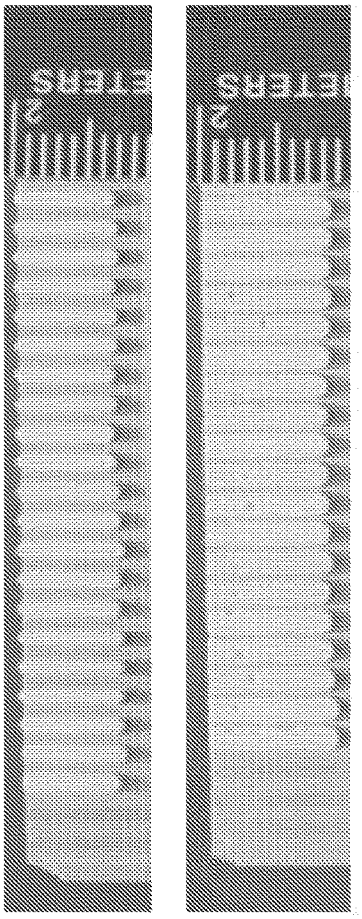
Figure 3C:
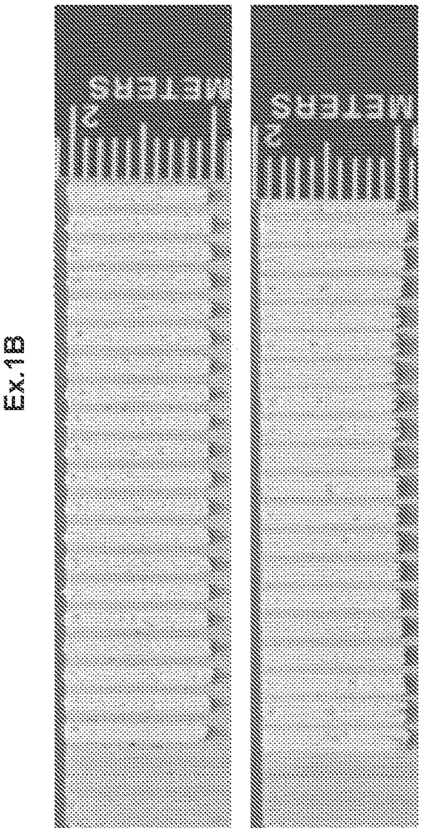
Figure 3D:
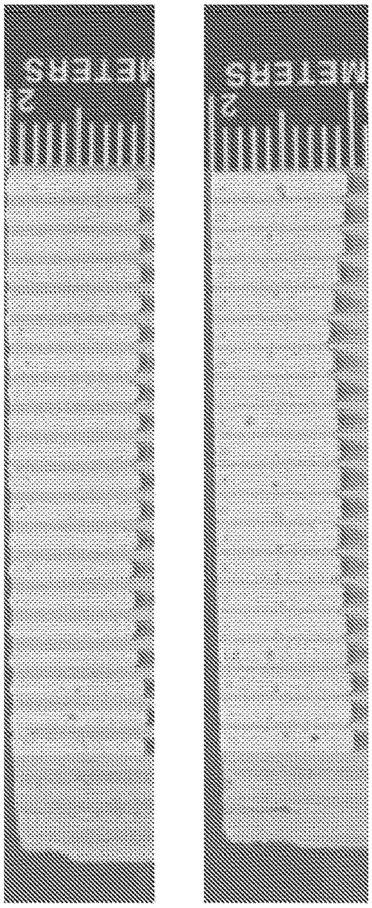

Referring now to FIG. 2, a method 200 for making a porous ceramic wall filter (e.g., the wall filter 100 shown in FIG. 1A) is provided. The method 200 comprises a step 202 of providing a ceramic honeycomb structure, such as the honeycomb structure 100' (see FIG. 1A). As shown in FIG. 2, the honeycomb structure 100' comprises a matrix of intersecting porous ceramic walls 106 which form a plurality of inlet cells 108 and outlet cells 110 (also referred to as "channels") bounded by the porous ceramic walls 106 that extend longitudinally from an upstream inlet end 102 to a downstream outlet end 104 (not shown in FIG. 2, see FIG. 1A).

Referring again to FIG. 2, the method 200 for making a porous ceramic wall filter (e.g., the wall filter 100 shown in FIG. 1A) further comprises a step 204 of selectively inserting a cement mixture (i.e., any of the cement mixtures detailed in this disclosure) into an end (e.g., at the inlet end 102 or outlet end 104 of the honeycomb structure 100') of at least one predetermined cell channel (e.g., inlet or outlet cells or channels 108 and 110) of the ceramic honeycomb structure. For example, the cement mixture can be forced into selected open cells of either a green honeycomb structure 100' or an already fired honeycomb structure 100' in the desired plugging pattern and to the desired depth, by one of several plugging process methods. For example, selected channels can be end plugged as shown in FIGS. 1A and 2 to provide a wall flow filter 100 configuration whereby the flow paths resulting from alternate channel plugging direct a fluid or gas stream entering the upstream inlet end 102 of the exemplified wall filter 100, through the porous cell walls 106 prior to exiting the filter at the downstream outlet end 104. The plugging can be effectuated by, for example, using a known masking apparatus and process such as that disclosed and described in U.S. Pat. No. 6,673,300, the salient portions of which related to plugging are incorporated by reference herein.

As noted earlier, the cement mixture employed in the method 200 depicted in FIG. 2 comprises: (i) inorganic ceramic particles; (ii) an inorganic binder; (iii) an organic binder comprising one or more of a hydrophilic polymer and a hydrophilic additive; and (iv) an aqueous liquid vehicle. Further, the cement mixture disposed in the at least one predetermined cell channel is in the form of at least one respective plug (e.g., plug 112 shown in FIGS. 1A and 2) that blocks the channel (e.g., inlet or outlet cells or channels 108 and 110). In addition, and as noted earlier, the cement mixture can exhibit a viscosity of less than 7000 Pa·s at a shear rate of less than 0.1/sec and a viscosity of greater than 25 Pa·s at a shear rate from 20/sec to 100/sec.

As also depicted in FIG. 2, the method 200 also comprises a step 206 of drying the at least one plug for a period of time sufficient to at least substantially remove the liquid vehicle from the at least one plug. The resulting plugged honeycomb body (e.g., wall flow filter 100) can then be dried, and optionally fired under suitable conditions, as understood by those with ordinary skill in the field of the disclosure, that are effective to convert the plugging mixture into a primary sintered phase ceramic composition. Conditions effective for drying the plugging material comprise those conditions capable of removing at least substantially all of the liquid vehicle present within the plugging mixture. As used herein, at least substantially all include the removal of at least 95%, at least 98%, at least 99%, or even at least 99.9% of the liquid vehicle present in the plugging mixture. Exemplary and non-limiting drying conditions suitable for removing the liquid vehicle include ambient, room temperature drying and/or heating the end-plugged honeycomb substrate at a temperature of at least 50° C., at least 60° C., at least 70° C., at least 80° C., at least 90° C., at least 100° C., at least 110° C., at least 120° C., at least 130° C., at least 140° C., or even at least 150° C. for a period of time sufficient to at least substantially remove the liquid vehicle from the plugging mixture. In one embodiment, the conditions effective to at least substantially remove the liquid vehicle comprise heating the plugging mixture at a temperature of at least about 60° C. In another embodiment, the end-plugged honeycomb substrate can be heated from about 60° to about 150° C. to remove the liquid vehicle. Further, the heating can be provided by a known method, including for example, hot air drying, or RF and/or microwave drying.

EXAMPLES

To further illustrate the principles of the disclosure, the following examples are put forth so as to provide those of ordinary skill in the art with a complete disclosure and description of how the cement mixtures and methods claimed herein are made and evaluated. They are intended to be purely exemplary of the cement mixtures and methods of the disclosure, and are not intended to limit the scope of what the inventors regard as their invention. Unless indicated otherwise, parts are parts by weight, the drying temperature is 75° C. or ambient temperature, and pressure is at or near atmospheric.

Example 1

In this example, honeycomb structures with asymmetric cell geometries were plugged with cement mixtures and methods according to principles of the disclosure. The honeycomb structures of this example are asymmetric in the sense that the adjacent cell channels at each of the inlet and outlet ends of the structure have differing dimensions in \cross-sections of 0.7 mm×2.5 mm and the other alternating cells are also square in cross-section, but with differing dimensions. The composition of the cement mixtures employed in this example to form the plugs in these honeycomb structures are detailed below in Table 1 (i.e., Ex. 1, Ex. 1A, Ex. 1B and Ex. 1C). The plugging pressures employed in this example are 20 psi and 10 psi for the larger and smaller cell channels, respectively.

TABLE 1

| Component (wt. % of cement mixture) | Ex. 1 | Ex. 1A | Ex. 1B | Ex. 1C |
|---|---|---|---|---|
| inorganic ceramic powder | 62.121% cordierite | 62.21% cordierite | 64.22% cordierite | 64.13% cordierite |
| inorganic binder (aq. colloidal silica, 50 wt. % particles) | 18.63% $SiO_2$ | 18.66% $SiO_2$ | 17.61% $SiO_2$ | 17.58% $SiO_2$ |
| organic binder | 0.62% | 0.47% | 0.44% | 0.59% |

TABLE 1-continued

| Component (wt. % of cement mixture) | Ex. 1 | Ex. 1A | Ex. 1B | Ex. 1C |
|---|---|---|---|---|
| | methyl cellulose | HEC | HEC 0.12% PEO | methyl cellulose 0.12% PEO |
| liquid vehicle | 18.63% $H_2O$ | 18.66% $H_2O$ | 17.61% $H_2O$ | 17.58% $H_2O$ |
| Maximum plug depth, $PD_{max}$ | 7.0 mm | 8.0 mm | 18.7 mm | 16.7 mm |

Referring now to FIGS. 3A-3D, optical micrographs of respective cross-sections of porous ceramic wall filters with the cement mixtures of Table 1 disposed in their respective cell channels are provided. As is evident from the FIGURES, the porous ceramic wall filters plugged with cement mixtures having an organic binder that comprises PEO exhibit a 15% to 40% increase in maximum plug depth ($PD_{max}$) (see FIGS. 3C and 3D, and Exs. 1B and 1C in Table 1, respectively) relative to the wall filters with plugs having a cement mixture that lacks PEO (see FIGS. 3A and 3B, and Ex. 1A, and Ex. 1, respectively), all as plugged at the same pressures. It is evident from this example that cement mixtures of the disclosure can be employed to provide plugs with a significant depth and quality in honeycomb structures with asymmetric geometries at a particular plugging pressure.

Example 2

In this example, honeycomb structures were plugged to obtain relatively short plugging depths. Shorter plugs with large cell diameters can be problematic from a processing standpoint as shorter plug depths may be achieved by using a fraction of the available plugging pressure associated with longer plugs. At these lower plugging pressure levels, known cement mixtures may result in less compressed or compacted plugs than plugs that are plugged at longer depths with higher plugging pressures. Known cement mixtures, when employed to produce shorter plugs, may result in plugs with lower plug strengths due to lower particle packing, and lower quality levels due to voids and other defects.

Figure 5A:
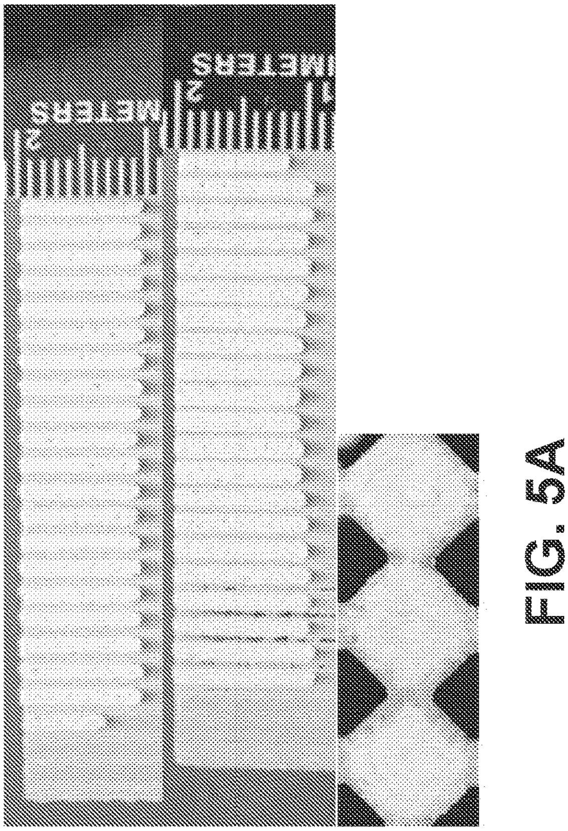
FIGS. 5A-5D are optical micrographs of respective cross-sections of porous ceramic wall filters with cement mixtures disposed in their respective cell channels, according to embodiments of the disclosure.
Figure 5B:
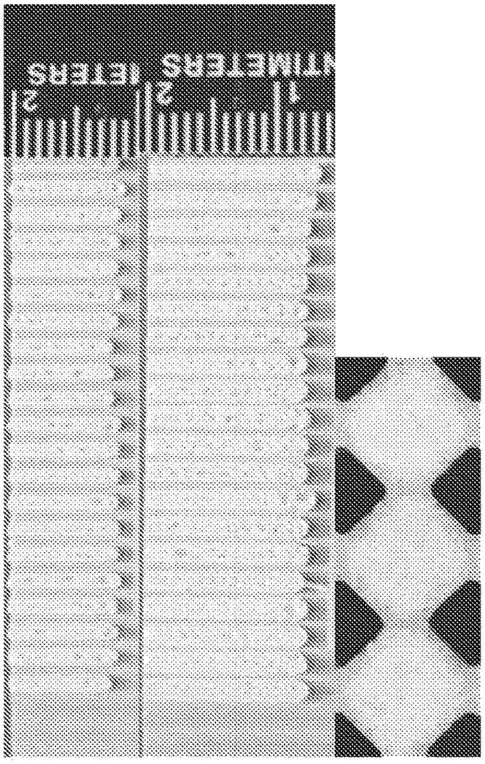
Figure 5C:
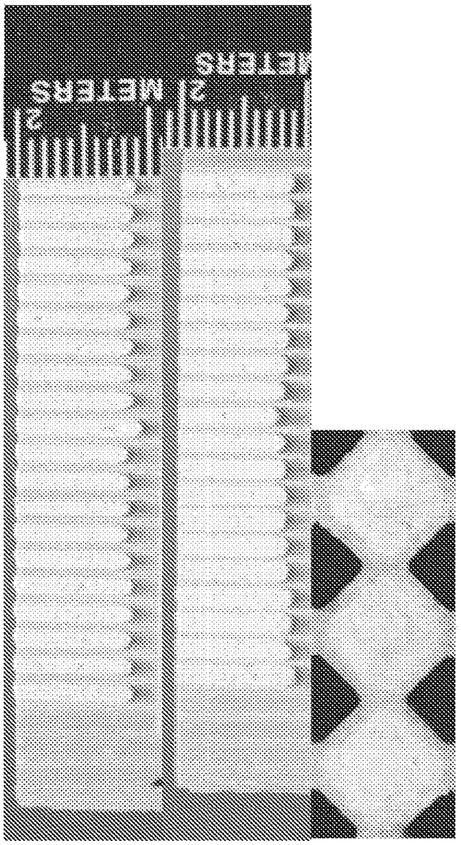
Figure 5D:
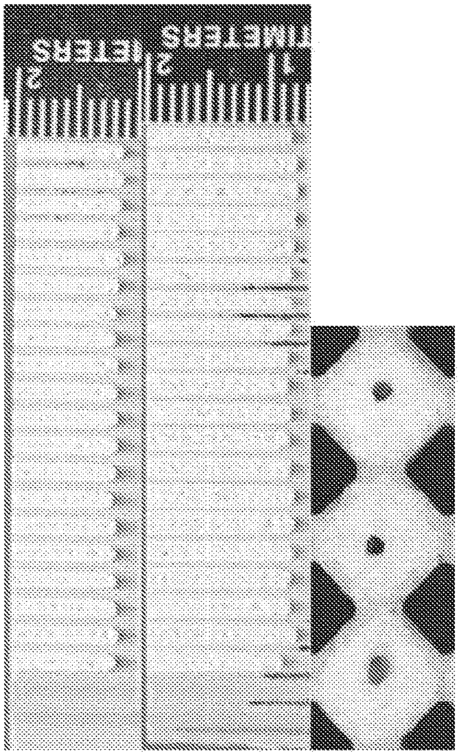

The honeycomb structures of this example are symmetric in the sense that the adjacent cell channels at each of the inlet and outlet ends of the structure have the same dimensions. In particular, cells of these honeycomb structures have square cross-sections with the following dimensions: 0.7 mm×2.5 mm. The composition of the cement mixtures employed in this example to form the plugs in these honeycomb structures are detailed above in Table 1 (i.e., Ex. 1 and Ex. 1B). Further, some of the as-plugged samples of this example were air dried (see FIGS. 5C and 5D) and the others were dried at 75° C. in an oven (see FIGS. 5A and 5B, outlined below).

Figure 4A:
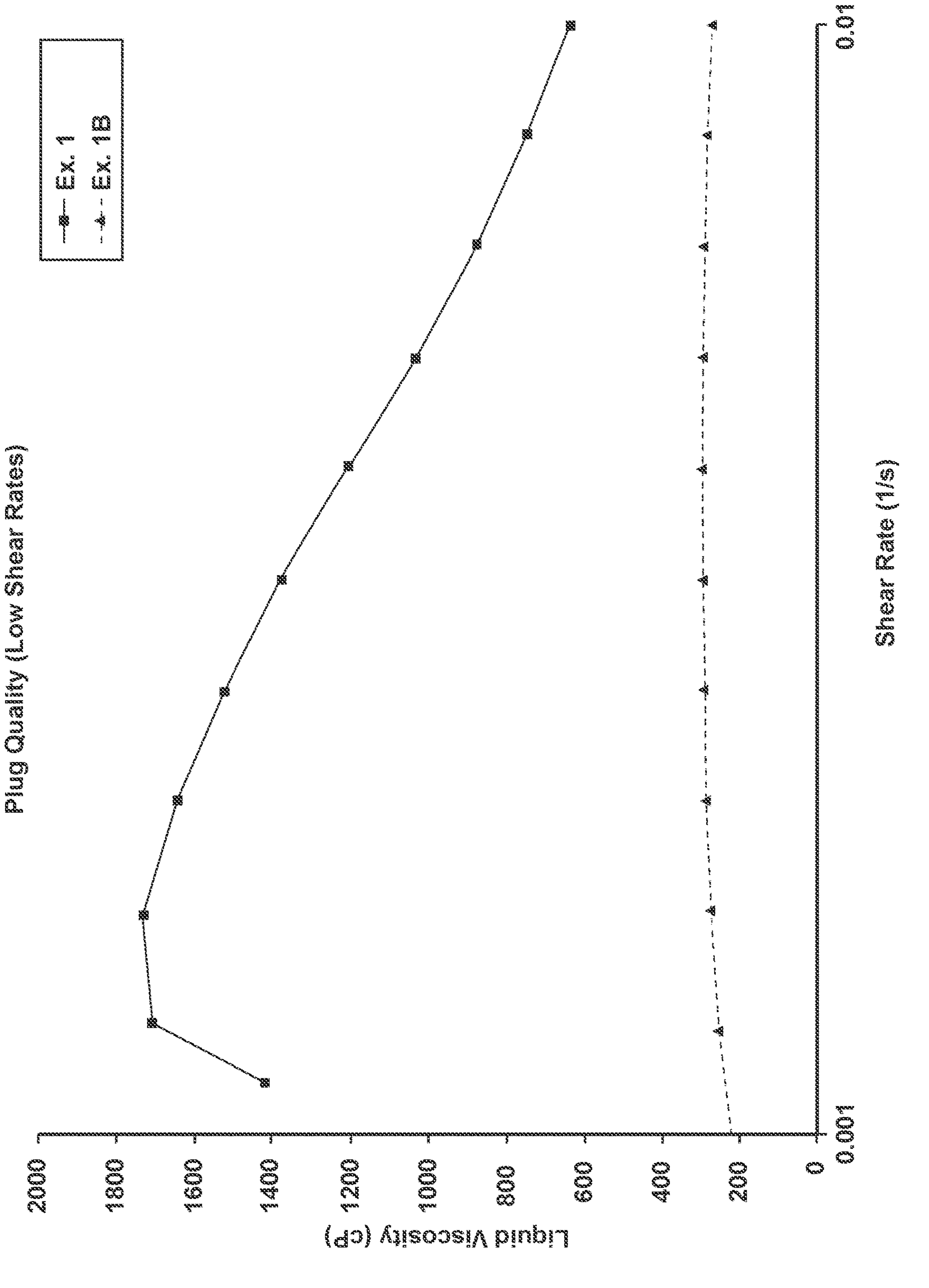
FIG. 4A is a plot of liquid viscosity vs. shear rate range from 0.001 $s^{-1}$ to 100 $s^{-1}$ for cement mixtures for applying to honeycomb bodies, according to embodiments of the disclosure.
Figure 4B:
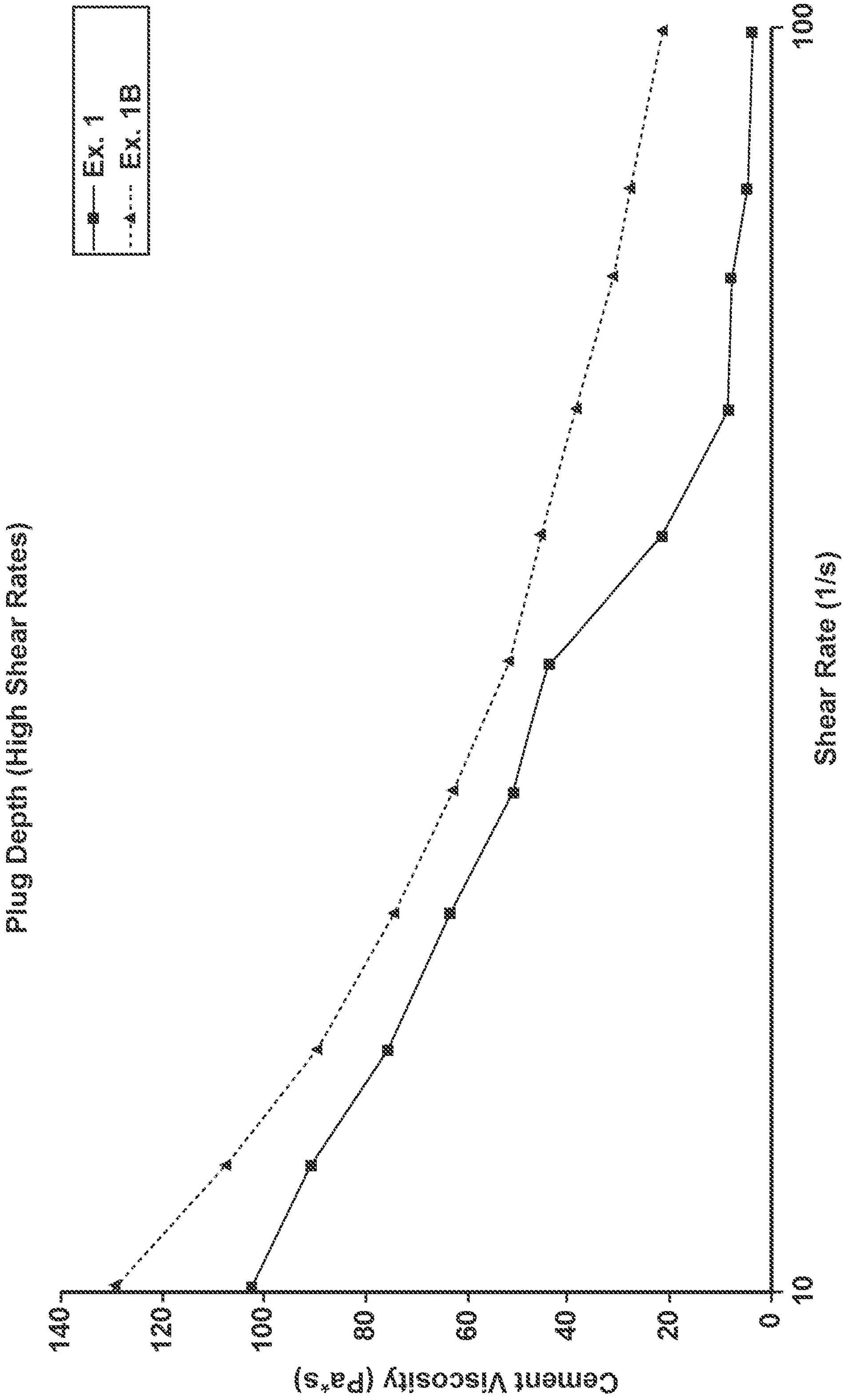
FIG. 4B is an enlarged portion of the plot depicted in FIG. 4A over a shear rate range from 10 $s^{-1}$ to 100 $s^{-1}$ that reports cement viscosity vs. shear rate.

Referring now to FIG. 4A, a plot is provided of liquid viscosity vs. shear rate from 0.001 $s^{-1}$ to 100 $s^{-1}$ for the cement mixtures of this example (Ex. 1 and Ex. 1B), as employed to form plugs in the honeycomb structures of this example. Further, FIG. 4B is an enlarged portion of the plot depicted in FIG. 4A over a shear rate from 10 $s^{-1}$ to 100 $s^{-1}$, reporting cement viscosity (Pa*s) as a function of shear rate. As is evident in FIGS. 4A and 4B, in the low shear rate regime (<0.1/sec), the liquid viscosity levels of the cement mixtures of the disclosure containing PEO (Ex. 1B) are substantially lower than the viscosities of a cement mixture employing methyl cellulose as an organic binder without a hydrophilic polymer or other hydrophilic additive (Ex. 1). Conversely, in the high shear rate regime (10/sec to 100/sec), the cement viscosity levels of the cement mixtures of the disclosure containing PEO (Ex. 1B) are substantially higher than the cement viscosities of a cement mixture employing methyl cellulose as an organic binder without a hydrophilic polymer or other hydrophilic additive (Ex. 1). Without being bound by theory, is believed that these higher viscosities in the high shear rate regime allow for more time for the cement mixture to travel within a given cell, thus maximizing the plug depth that can be achieved. That is, the maximum plug depth can be dependent upon the volume and viscosity of excess fluid in the cement mixture in the high shear rate regime. The more and higher viscosity of the excess fluid in the cement mixture, the longer time that the cement mixture can travel within a cell of the honeycomb structure during the plugging process.

Referring now to FIGS. 5A-5D, optical micrographs are provided of respective cross-sections of porous ceramic wall filters with cement mixtures (Ex. 1 and Ex. 1B) disposed in their respective cell channels according to this example. As is evident from FIGS. 5A-5D, the ceramic wall filters employing cement mixtures of the disclosure with PEO (Ex. 1B) exhibited a much lower prevalence of voids and other defects in comparison to the wall filters employing the cement mixtures employing methyl cellulose as an organic binder without a hydrophilic polymer or other hydrophilic additive (Ex. 1). In addition, it is evident that adjustment in the drying temperature had little effect on the quality of the plugs formed with the cement mixtures of the disclosure (Ex. 1B) (See FIG. 5A versus FIG. 5C). Without being bound by theory, it appears that the cement mixtures of the disclosure employed in this example enable particularly fast reordering and packing during the plugging process, thus resulting in less sensitivity to the drying temperature employed in the process. In contrast, the wall filters employing the cement mixtures employing methyl cellulose as an organic binder without a hydrophilic polymer or other hydrophilic additive (Ex. 1) that were oven dried exhibited larger dimples as compared to the samples subjected to air drying (See FIG. 5B versus FIG. 5D).

Example 3

In this example, honeycomb structures with asymmetric cell geometries were plugged with cement mixtures and methods according to principles of the disclosure. The honeycomb structures of this example are asymmetric in the sense that the adjacent cell channels at each of the inlet and outlet ends of the structure have differing dimensions in cross-section. In particular, alternating cells of these honeycomb structures have square cross-sections of 0.7 mm×2.5 mm and the other alternating cells have square cross-sections with different dimensions. The composition of the cement mixtures employed in this example to form the plugs in these honeycomb structures are detailed above in Table 1 (i.e., Ex. 1B and Ex. 1C). The plugging pressures employed in this example are 20 psi and 10 psi for the larger and smaller cell channels, respectively.

Figure 6B:
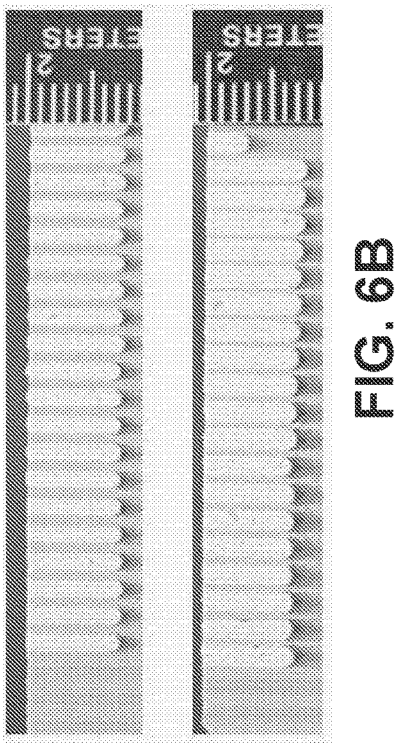
FIGS. 6A and 6B are optical micrographs of respective cross-sections of porous ceramic wall filters with cement mixtures disposed in their respective cell channels, according to embodiments of the disclosure.
Figure 6A:
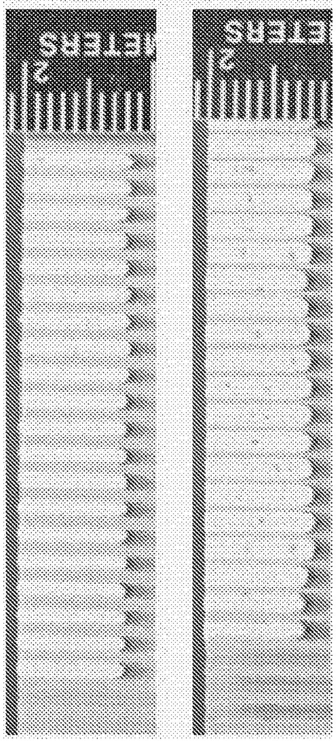

Referring now to FIGS. 6A and 6B, optical micrographs of respective cross-sections of porous ceramic wall filters with the cement mixtures of Table 1 disposed in their respective cell channels are provided. As is evident from the FIGURES, the porous ceramic wall filters of this example can be plugged with cement mixtures having an organic binder that comprises PEO (Exs. 1B and 1C) at plug depths below the maximum plug depth (~11-12 mm for the inlet cell channels and >23 mm for the outlet cell channels). In particular, the wall filters plugged with Ex. 1B cement mixture exhibit plug depths of 8.22 mm and 8.33 mm for the inlet and outlet cell channels, respectively. Further, the wall filters plugged with Ex. 1C cement mixture exhibit plug depths of 7.33 mm and 7.24 mm for the inlet and outlet cell channels, respectively. As noted earlier, the cement mixtures of the disclosure allow for deeper penetration of plugging cement, e.g., maximum plug depth (see Example 1). This example demonstrates that the increased maximum plug depth capability of these cement mixtures can be useful in allowing for adjustments to the composition without a decrease in plug quality. Further, the increased maximum plug depth capability can also be employed for further process control, e.g., as evidenced by the plugging at lower pressures in this example as compared to those employed to achieve the maximum plug depth, $PD_{max}$ (see Example 1).

Example 4

In this example, honeycomb structures with asymmetric cell geometries were plugged with cement mixtures and methods according to principles of the disclosure at differing plugging pressures to achieve different plug depths. The honeycomb structures of this example are asymmetric in the sense that the adjacent cell channels at each of the inlet and outlet ends of the structure have differing dimensions in cross-section. In particular, alternating cells of these honeycomb structures have square cross-sections of 0.7 mm×2.5 mm, and the other alternating cells have square cross-sections with differing dimensions. The composition of the cement mixtures employed in this example to form the plugs in these honeycomb structures are detailed above in Table 1 (i.e., Ex. 1B).

Figure 7A:
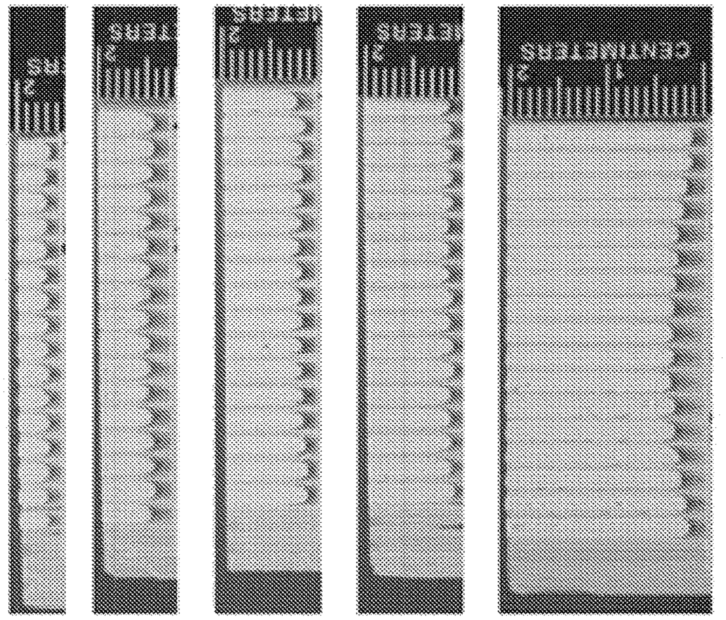
FIG. 7A is a series of optical micrographs of respective cross-sections of porous ceramic wall filters with a cement mixture composition disposed in their respective cell channels to varying depths, according to embodiments of the disclosure.
Figure 7B:
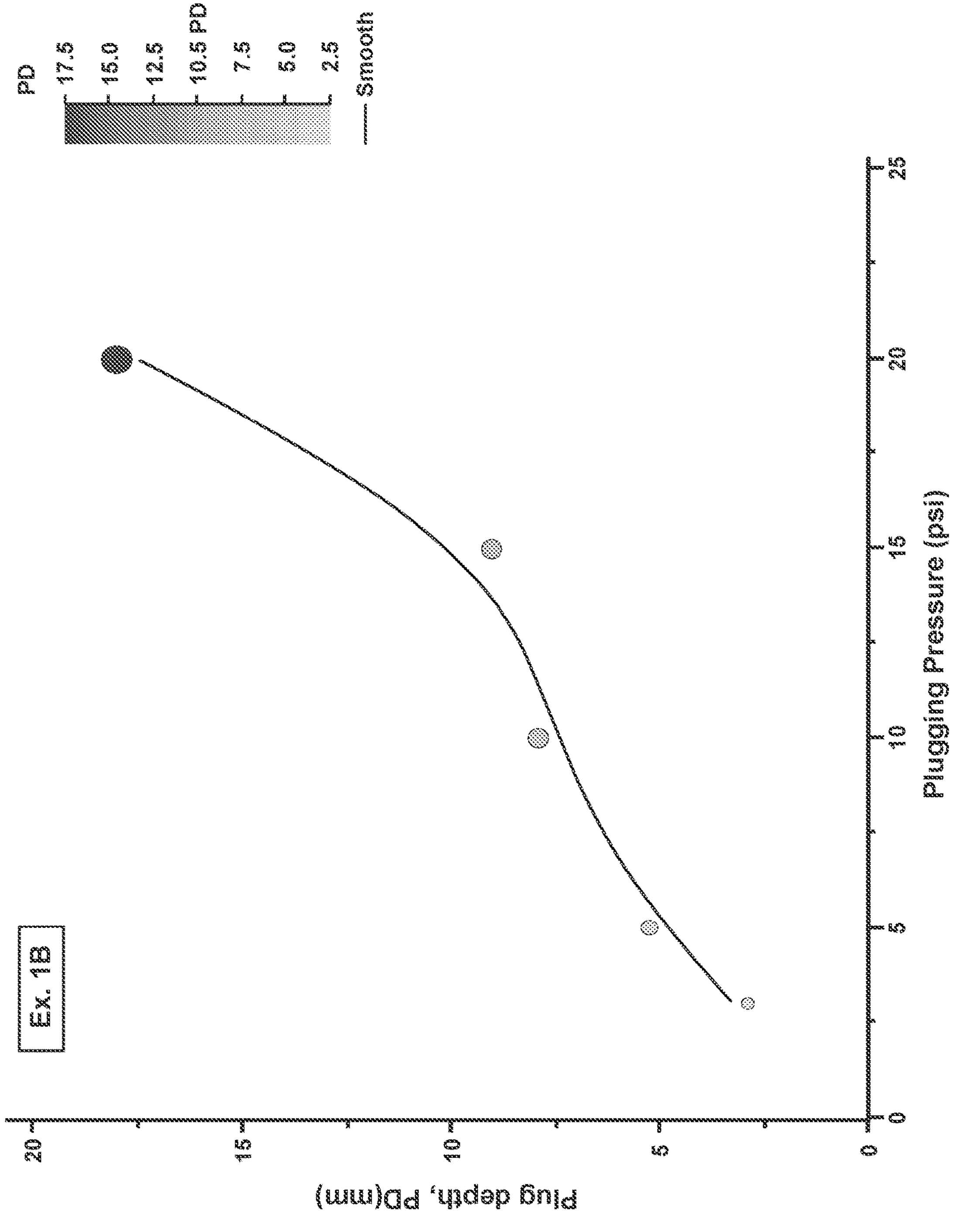
FIG. 7B is a plot of plug depth vs. plugging pressure for the samples depicted in FIG. 7A, according to embodiments of the disclosure.

Referring now to FIG. 7A, a series of optical micrographs is provided of respective cross-sections of porous ceramic wall filters with a cement mixture composition (Ex. 1B) disposed in their respective cell channels to varying depths. These varying depths are achieved by varying the plugging pressure. In particular, FIG. 7B is a plot of plug depth vs. plug pressure for the samples depicted in FIG. 7A. As is evident from these FIGURES, the same cement mixture composition (Ex. 1B) was employed to achieve various plug depths with each sample exhibiting plugs with high quality. That is, a cement mixture consistent with the principles of the disclosure was employed in this example to produce wall flow filters having plugs of various depths (from about 3 mm to 20 mm), with high quality plugs at each of these plug depths. In contrast, for wall flow filters produced according to these same conditions with a cement mixture employing methyl cellulose as an organic binder without a hydrophilic polymer or other hydrophilic additive (e.g., Ex. 1), reasonable plug quality can only be achieved with a small window of plug depths (e.g., ~5-6 mm) and a limited maximum plug depth (~10 mm).

According to a first aspect, a cement mixture for applying to a honeycomb body is provided comprising: (i) inorganic ceramic particles; (ii) an inorganic binder; (iii) an organic binder comprising one or more of a hydrophilic polymer and a hydrophilic additive; and (iv) an aqueous liquid vehicle, wherein the cement mixture exhibits a cement viscosity of less than 7000 Pa·s at a shear rate of less than 0.1/sec and greater than 25 Pa·s at a shear rate from 20/sec to 100/sec.

According to a second aspect, the first aspect is provided, further comprising: a solids component and a liquids component, the solids component comprising the inorganic ceramic particles and the liquids component comprising the inorganic binder, the organic binder and the aqueous liquid vehicle, wherein the liquids component further exhibits a liquid viscosity from 50 centipoise to 1500 centipoise at a shear rate from 0.001/sec to 0.007/sec.

According to a third aspect, the first aspect is provided, further comprising: a solids component and a liquids component, the solids component comprising the inorganic ceramic particles and the liquids component comprising the inorganic binder, the organic binder and the aqueous liquid vehicle, wherein the liquids component further exhibits a liquid viscosity from 100 centipoise to 1000 centipoise at a shear rate from 0.001/sec to 0.007/sec.

According to a fourth aspect, the first aspect is provided, further comprising: a solids component and a liquids component, the solids component comprising the inorganic ceramic particles and the liquids component comprising the inorganic binder, the organic binder and the aqueous liquid vehicle, wherein the liquids component further exhibits a liquid viscosity from 100 centipoise to 600 centipoise at a shear rate from 0.001/sec to 0.007/sec.

According to a fifth aspect, any one of the first through fourth aspects is provided, wherein the hydrophilic polymer comprises one or more of hydroxyethyl cellulose (HEC), methyl cellulose, polyethylene oxide (PEO), carboxymethyl cellulose, hydroxypropyl cellulose, polyvinyl alcohol, poly (2-oxazoline), dextran, dextrin, a gum, pectin, polysaccharides, modified cellulose, polyacrylic acid and polystyrene sulfonate.

According to a sixth aspect, any one of the first through fifth aspects is provided, wherein the hydrophilic additive comprises one or more of polyethylene oxide (PEO), polyvinylpyrrolidone (PVP), xanthan gum, a PEO-polypropylene oxide (PPO) block copolymer, and PPO.

According to a seventh aspect, a cement mixture for applying to a honeycomb body is provided comprising: (i) inorganic ceramic particles from 55% to 70% by weight; (ii) an inorganic binder at 15% to 20% by weight; (iii) an organic binder at 0.25% to 1.25% by weight, the organic binder comprising one or more of a hydrophilic polymer and a hydrophilic additive; and (iv) an aqueous liquid vehicle at 15% to 20% by weight.

According to an eighth aspect, the seventh aspect is provided, wherein the inorganic binder comprises aqueous colloidal silica and the inorganic ceramic particles comprises cordierite.

According to a ninth aspect, the seventh aspect is provided, wherein the cement mixture comprises a solids component and a liquids component, the solids component comprising the inorganic ceramic particles and the liquids component comprising the inorganic binder, the organic binder and the aqueous liquid vehicle, wherein a ratio of the solids component to the liquids component is from 0.82:1 to 4:1.

According to a tenth aspect, any one of the seventh through ninth aspects is provided, further comprising: a solids component and a liquids component, the solids component comprising the inorganic ceramic particles and the liquids component comprising the inorganic binder, the organic binder and the aqueous liquid vehicle, wherein the liquids component further exhibits a liquid viscosity from 50 centipoise to 1500 centipoise at a shear rate from 0.001/sec to 0.007/sec.

According to an eleventh aspect, any one of the seventh through tenth aspects is provided, wherein the cement mixture further exhibits a cement viscosity of less than 7000

Pa·s at a shear rate of less than 0.1/sec and greater than 25 Pa·s at a shear rate from 20/sec to 100/sec.

According to a twelfth aspect, any one of the seventh through eleventh aspects is provided, wherein the hydrophilic polymer comprises one or more of hydroxyethyl cellulose (HEC), methyl cellulose, polyethylene oxide (PEO), carboxymethyl cellulose, hydroxypropyl cellulose, polyvinyl alcohol, poly(2-oxazoline), dextran, dextrin, a gum, pectin, polysaccharides, modified cellulose, polyacrylic acid and polystyrene sulfonate.

According to a thirteenth aspect, any one of the seventh through twelfth aspects is provided, wherein the hydrophilic additive comprises one or more of polyethylene oxide (PEO), polyvinylpyrrolidone (PVP), xanthan gum, a PEO-polypropylene oxide (PPO) block copolymer, and PPO.

According to a fourteenth aspect, any one of the seventh through thirteenth aspects is provided, wherein the organic binder comprises one of: (a) hydroxyethyl cellulose (HEC), (b) polyethylene oxide (PEO), (c) HEC and PEO, and (d) methyl cellulose and PEO.

According to a fifteenth aspect, any one of the seventh through thirteenth aspects is provided, wherein the organic binder comprises one of: (a) hydroxyethyl cellulose (HEC) at 0.2% to 0.7% by weight, (b) polyethylene oxide (PEO) at 0.1% to 0.8% by weight, (c) HEC and PEO at 0.1% to 1% and 0.03% to 0.47% by weight, respectively, and (d) methyl cellulose and PEO at 0.3% to 0.8% and 0.03% to 0.47% by weight, respectively.

According to a sixteenth aspect, a method for manufacturing a porous ceramic wall flow filter is provided, comprising the steps of: selectively inserting a cement mixture into an end of at least one predetermined cell channel of a ceramic honeycomb structure, wherein the ceramic honeycomb structure comprises a matrix of intersecting porous ceramic walls which form a plurality of cell channels bounded by the porous ceramic walls that extend longitudinally from an upstream inlet end to a downstream outlet end and the cement mixture comprises: (i) inorganic ceramic particles, (ii) an inorganic binder, (iii) an organic binder comprising one or more of a hydrophilic polymer and a hydrophilic additive, and (iv) an aqueous liquid vehicle, wherein the cement mixture disposed in the at least one predetermined cell channel is in the form of a plug that blocks the channel; and drying the plug for a period of time sufficient to at least substantially remove the liquid vehicle from the plug, wherein the cement mixture disposed in at least one predetermined cell channel is in the form of at least one respective plug that blocks the respective at least one channel, and further wherein the cement mixture exhibits a cement viscosity of less than 7000 Pa·s at a shear rate of less than 0.1/sec and greater than 25 Pa·s at a shear rate from 20/sec to 100/sec.

According to a seventeenth aspect, the sixteenth aspect is provided, further comprising: a solids component and a liquids component, the solids component comprising the inorganic ceramic particles and the liquids component comprising the inorganic binder, the organic binder and the aqueous liquid vehicle, wherein the liquids component comprises a liquid viscosity from 50 centipoise to 1500 centipoise at a shear rate from 0.001/sec to 0.007/sec.

According to an eighteenth aspect, the sixteenth aspect is provided, further comprising: a solids component and a liquids component, the solids component comprising the inorganic ceramic particles and the liquids component comprising the inorganic binder, the organic binder and the aqueous liquid vehicle, wherein the liquids component comprises a liquid viscosity from 100 centipoise to 1000 centipoise at a shear rate from 0.001/sec to 0.007/sec.

According to a nineteenth aspect, any one of the sixteenth through eighteenth aspects is provided, wherein the cement mixture comprises: (i) inorganic ceramic particles at 55% to 70%; (ii) an inorganic binder at 15% to 20% by weight; (iii) an organic binder at 0.25% to 1.25% by weight, the organic binder comprising one or more of a hydrophilic polymer and a hydrophilic additive; and (iv) an aqueous liquid vehicle at 15% to 20% by weight.

According to a twentieth aspect, any one of the sixteenth through nineteenth aspects is provided, wherein the hydrophilic polymer comprises one or more of hydroxyethyl cellulose (HEC), methyl cellulose, polyethylene oxide (PEO), carboxymethyl cellulose, hydroxypropyl cellulose, polyvinyl alcohol, poly(2-oxazoline), dextran, dextrin, a gum, pectin, polysaccharides, modified cellulose, polyacrylic acid and polystyrene sulfonate.

According to a twenty-first aspect, any one of the sixteenth through twentieth aspects is provided, wherein the hydrophilic additive comprises one or more of polyethylene oxide (PEO), polyvinylpyrrolidone (PVP), xanthan gum, a PEO-polypropylene oxide (PPO) block copolymer, and PPO.

According to a twenty-second aspect, any one of the sixteenth through twenty-first aspects is provided, wherein the organic binder comprises one of: (a) hydroxyethyl cellulose (HEC), (b) polyethylene oxide (PEO), (c) HEC and PEO, and (d) methyl cellulose and PEO.

According to a twenty-third aspect, any one of the sixteenth through twenty-first aspects is provided, wherein the organic binder comprises one of: (a) hydroxyethyl cellulose (HEC) at 0.2% to 0.7% by weight, (b) polyethylene oxide (PEO) at 0.1% to 0.8% by weight, (c) HEC and PEO at 0.1% to 1% and 0.03% to 0.47% by weight, respectively, and (d) methyl cellulose and PEO at 0.3% to 0.8% and 0.03% to 0.47% by weight, respectively.

According to a twenty-fourth aspect, any one of the sixteenth through twenty-first aspects is provided, wherein the cement mixture further comprises: a solids component and a liquids component, the solids component comprising the inorganic ceramic particles and the liquids component comprising the inorganic binder, the organic binder and the aqueous liquid vehicle, and further wherein a ratio of the solids component to the liquids component is from 0.82:1 to 4:1.

According to a twenty-fifth aspect, a filter body is provided that comprises: a honeycomb structure comprised of intersecting porous walls of a first ceramic material that define channels extending from a first end to a second end; plugging material disposed in a first plurality of the channels; plugging material disposed in a second plurality of the channels, wherein the channels of the first plurality are distinct from the channels of the second plurality; wherein the plugging material disposed in the first plurality, or in the second plurality, or both, is comprised of: a second ceramic material; an inorganic binder comprising one or more of silica and alumina; and an organic binder comprising one or more of a hydrophilic polymer and a hydrophilic additive.

According to a twenty-sixth aspect, the twenty-fifth aspect is provided, wherein the second ceramic material has the same composition as the first ceramic material.

According to a twenty-seventh aspect, the twenty-fifth aspect is provided, wherein the second ceramic material has a composition that differs from the first ceramic material.

According to a twenty-eighth aspect, any one of the twenty-fifth through twenty-seventh aspects is provided, wherein the hydrophilic polymer comprises one or more of hydroxyethyl cellulose (HEC), methyl cellulose, polyethylene oxide (PEO), carboxymethyl cellulose, hydroxypropyl cellulose, polyvinyl alcohol, poly(2-oxazoline), dextran, dextrin, a gum, pectin, polysaccharides, modified cellulose, polyacrylic acid and polystyrene sulfonate.

According to a twenty-ninth aspect, any one of the twenty-fifth through twenty-eighth aspects is provided, wherein the hydrophilic additive comprises one or more of polyethylene oxide (PEO), polyvinylpyrrolidone (PVP), xanthan gum, a PEO-polypropylene oxide (PPO) block copolymer, and PPO.

According to a thirtieth aspect, any one of the twenty-fifth through twenty-ninth aspects is provided, wherein the organic binder comprises one of: (a) hydroxyethyl cellulose (HEC), (b) polyethylene oxide (PEO), (c) HEC and PEO, and (d) methyl cellulose and PEO.

While exemplary embodiments and examples have been set forth for the purpose of illustration, the foregoing description is not intended in any way to limit the scope of the disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A cement mixture for plugging a honeycomb body, the cement mixture comprising:
- inorganic ceramic particles;
- an inorganic binder;
- an organic binder comprising at least one of methyl cellulose or hydroxyethyl cellulose;
- a hydrophilic additive comprising polyethylene oxide or polyvinylpyrrolidone in an amount from 0.03% to 0.47% by weight;
- an aqueous liquid vehicle; and
- wherein the cement mixture exhibits a cement viscosity of less than 7000 Pas at a shear rate of less than 0.1/sec and greater than 25 Pa·s at a shear rate from 20/sec to 100/sec.

2. The cement mixture of claim 1, further comprising a solids component and a liquids component, the solids component comprising the inorganic ceramic particles and the liquids component comprising the inorganic binder, the organic binder, and the aqueous liquid vehicle, the liquids component further exhibiting a liquid viscosity from 50 centipoise to 1500 centipoise at a shear rate from 0.001/sec to 0.007/sec.

3. The cement mixture of claim 1, further comprising a solids component and a liquids component, the solids component comprising the inorganic ceramic particles and the liquids component comprising the inorganic binder, the organic binder, and the aqueous liquid vehicle, the liquids component further exhibiting a liquid viscosity from 100 centipoise to 1000 centipoise at a shear rate from 0.001/sec to 0.007/sec.

4. The cement mixture of claim 1, further comprising a solids component and a liquids component, the solids component comprising the inorganic ceramic particles and the liquids component comprising the inorganic binder, the organic binder, and the aqueous liquid vehicle, the liquids component further exhibiting a liquid viscosity from 100 centipoise to 600 centipoise at a shear rate from 0.001/sec to 0.007/sec.

5. The cement mixture of claim 1, wherein the inorganic binder comprises aqueous colloidal silica and the inorganic ceramic particles comprise cordierite.

6. The cement mixture of claim 1, further comprising a solids component and a liquids component, the solids component comprising the inorganic ceramic particles and the liquids component comprising the inorganic binder, the organic binder, and the aqueous liquid vehicle, and a ratio of the solids component to the liquids component is from 0.82:1 to 4:1.

7. The cement mixture of claim 1, wherein the organic binder comprises hydroxyethyl cellulose in an amount from 0.1% to 1% by weight.

8. The cement mixture of claim 1, wherein the organic binder comprises methyl cellulose in an amount from 0.3% to 0.8% by weight.

9. The cement mixture of claim 1, wherein the shear viscosity is greater than 25 Pa·s at a shear rate from 40/sec to 100/sec.

10. The cement mixture of claim 1, wherein the cement mixture comprises the inorganic ceramic particles in an amount from 45% to 80% by weight.

* * * * *